US009286130B2

(12) United States Patent
Ashok et al.

(10) Patent No.: US 9,286,130 B2
(45) Date of Patent: Mar. 15, 2016

(54) OPTIMIZING VIRTUAL MACHINE DEPLOYMENT TIME BY TEMPORARILY ALLOCATING MORE PROCESSING RESOURCES DURING THE INITIAL DEPLOYMENT TIME OF THE VIRTUAL MACHINE

(75) Inventors: Rohith K. Ashok, Apex, NC (US); Douglas A. Larson, Raleigh, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 13/595,540

(22) Filed: Aug. 27, 2012

(65) Prior Publication Data
US 2014/0059542 A1 Feb. 27, 2014

(51) Int. Cl.
*G06F 9/455* (2006.01)
*G06F 9/50* (2006.01)

(52) U.S. Cl.
CPC .................................. *G06F 9/5077* (2013.01)

(58) Field of Classification Search
None
See application file for complete search history.

(56) References Cited

U.S. PATENT DOCUMENTS

| 5,764,740 | A | 6/1998 | Holender |
| 8,250,574 | B2 * | 8/2012 | Baba ....................... G06F 9/505 718/1 |
| 2006/0136913 | A1 | 6/2006 | Sameske |
| 2007/0288224 | A1 * | 12/2007 | Sundarrajan .......... G06F 9/5072 703/22 |
| 2008/0095176 | A1 | 4/2008 | Ong et al. |
| 2010/0037038 | A1 | 2/2010 | Bieswanger et al. |
| 2011/0154320 | A1 * | 6/2011 | Verma ............................... 718/1 |
| 2012/0131579 | A1 | 5/2012 | Pujolle et al. |
| 2012/0180058 | A1 | 7/2012 | Barsness et al. |
| 2014/0006480 | A1 * | 1/2014 | Dobrev et al. ................ 709/203 |

FOREIGN PATENT DOCUMENTS

WO 2010066430 A1 6/2010

OTHER PUBLICATIONS

International Search Report and Written Opinion for International Application No. PCT/EP2013/065908 dated Oct. 11, 2013, pp. 1-9.
Mell et al., "The NIST Definition of Cloud Computing," Special Publication 800-145, Sep. 2011.

(Continued)

*Primary Examiner* — Emerson Puente
*Assistant Examiner* — Zhi Chen
(74) *Attorney, Agent, or Firm* — Robert A. Voigt, Jr.; Winstead, P.C.

(57) ABSTRACT

A method, system and computer program product for optimizing virtual machine deployment time. A cloud controller receives a request from a user to configure a virtual machine with a designated CPU capacity. If the designated CPU capacity is less than or equal to a threshold, then the cloud controller determines if there are additional cloud resources available to be allocated to deploy the virtual machine. If so, then the cloud controller allocates additional CPU capacity to the designated CPU capacity to be used to provision the virtual machine thereby enabling a multithreaded startup to initialize the operating system and middleware tiers so as to reduce the deployment time of the virtual machine. The additional resources would only be available during the initial deployment time of the virtual machine and removed before the user is granted access to the system when it comes online.

12 Claims, 5 Drawing Sheets

(56) References Cited

OTHER PUBLICATIONS

Begnum et al., "Scalable Deployment and Configuration of High Performance and Virtual Clusters," CISE/CGCS, 2006, https://project.iu.hio.no/papers/ManageVirtualHPC.pdf.

"Shared Processors," http://pic.dhe.ibm.com/infocenter/powersys/v3r1m5/index.jsp?topic=%2Fiphat%2Fiphatsharedproc.htm, Oct. 30, 2009.

"Windows 7 Ultimate Tweaks & Utilities," http://www.ocztechnologyforum.com/forum/showthread.php?63273-*-Windows-7-Ultimate-Tweaks-amp-Utilities-*, last edited on Apr. 12, 2011, see pp. 5-6.

"Intel Turbo Boost Technology—On-Demand Processor Performance," http://www.intel.com/content/www/us/en/architecture-and-technology/turbo-boost/turbo-boost-technology.html, 2012.

Rob McNelly, "An LPAR Review," http://www.ibmsystemsmag.com/aix/administrator/lpar/An-LPAR-Review/, Sep. 2009.

"Windows 7 Ultimate Tweaks & Utilities," http://www.ocztechnologyforum.com/forum/showthread.php?63273-*-Windows-7-Ultimate-Tweaks-amp-Utilities-*, last edited on Apr. 12, 2011.

* cited by examiner

OPTIMIZING VIRTUAL MACHINE DEPLOYMENT TIME BY TEMPORARILY ALLOCATING MORE PROCESSING RESOURCES DURING THE INITIAL DEPLOYMENT TIME OF THE VIRTUAL MACHINE

TECHNICAL FIELD

The present invention relates generally to cloud computing, and more particularly to optimizing virtual machine deployment time by temporarily allocating more processing resources during the initial deployment time of the virtual machine.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of physical resources of the computer. A guest operating system runs on each guest, and the guest appears to the guest operating system as a real computer. Each guest operating system may host one or more virtual machines.

Currently, one of the most common guest configurations is a single core or a sub-core CPU allocation in order to achieve a high density consolidation. Since only a single or a sub-core CPU allocation is available, only a single thread (i.e., a stream of instructions) can be executed at a given time.

Multithreading refers to having multiple threads or multiple streams of instructions existing within the context of a single process. These threads share the process' resources but are able to be executed independently. As a result, if the operating system and middleware tiers could be initialized using a multithreaded startup, then the initialization of the operating system and middleware tiers could be performed more quickly thereby reducing the deployment time for the virtual guest instance and the virtual machine. However, multithreading cannot currently be achieved since only a single or a sub-core CPU allocation is available. Hence, the deployment time for the virtual guest instances and the virtual machines are significantly longer than if the operating system and middleware tiers could be initialized using a multithreaded startup.

BRIEF SUMMARY

In one embodiment of the present invention, a method for optimizing virtual machine deployment time comprises receiving a request to configure a virtual machine with a designated CPU capacity. The method further comprises provisioning the virtual machine with the designated CPU capacity plus an additional CPU capacity. Furthermore, the method comprises activating the virtual machine with the designated CPU capacity plus the additional CPU capacity. In addition, the method comprises issuing, by a processor, commands to a hypervisor to restore a CPU configuration of the virtual machine to the designated CPU capacity in response to a completion of the activation of the virtual machine.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
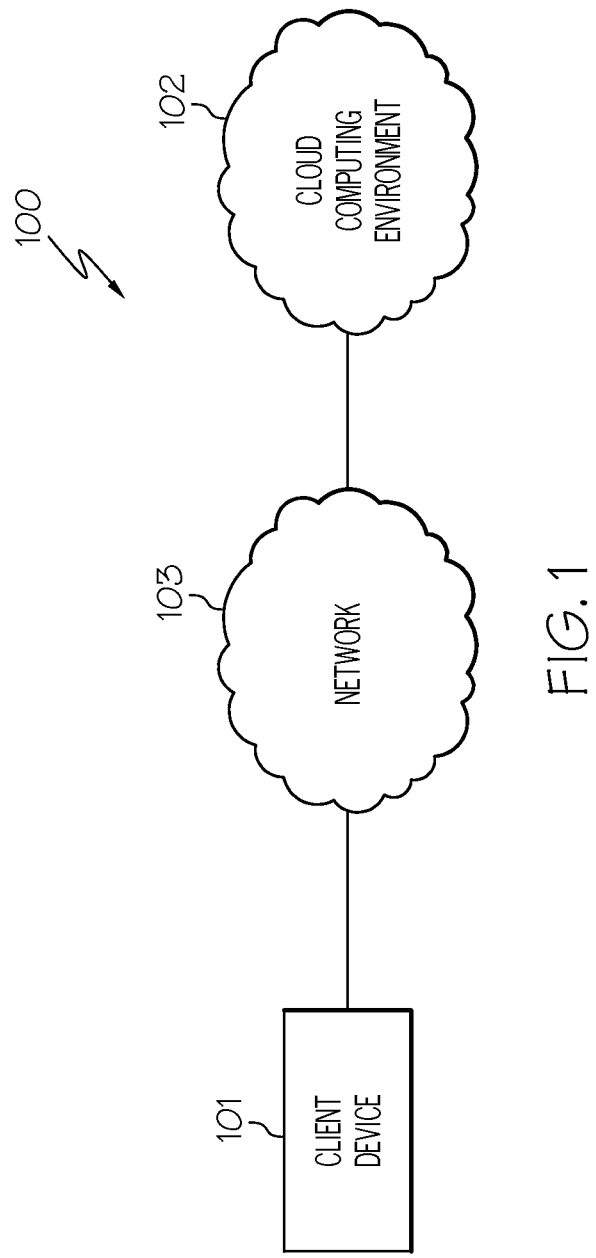
FIG. 1 illustrates a network system configured in accordance with an embodiment of the present invention.

The present invention comprises a method, system and computer program product for optimizing the virtual machine deployment time. In one embodiment of the present invention, a cloud controller receives a request from a user to configure a virtual machine with a designated CPU capacity. If the designated CPU capacity is less than or equal to a threshold, then the cloud controller determines if there are additional cloud resources available to be allocated to deploy the virtual machine. If so, then the cloud controller allocates additional CPU capacity to the designated CPU capacity to be used to provision the virtual machine thereby enabling a multithreaded startup to initialize the operating system and middleware tiers so as to reduce the deployment time of the virtual machine. The additional resources would only be available during the initial deployment time of the virtual machine and removed before the user is granted access to the system when it comes online.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
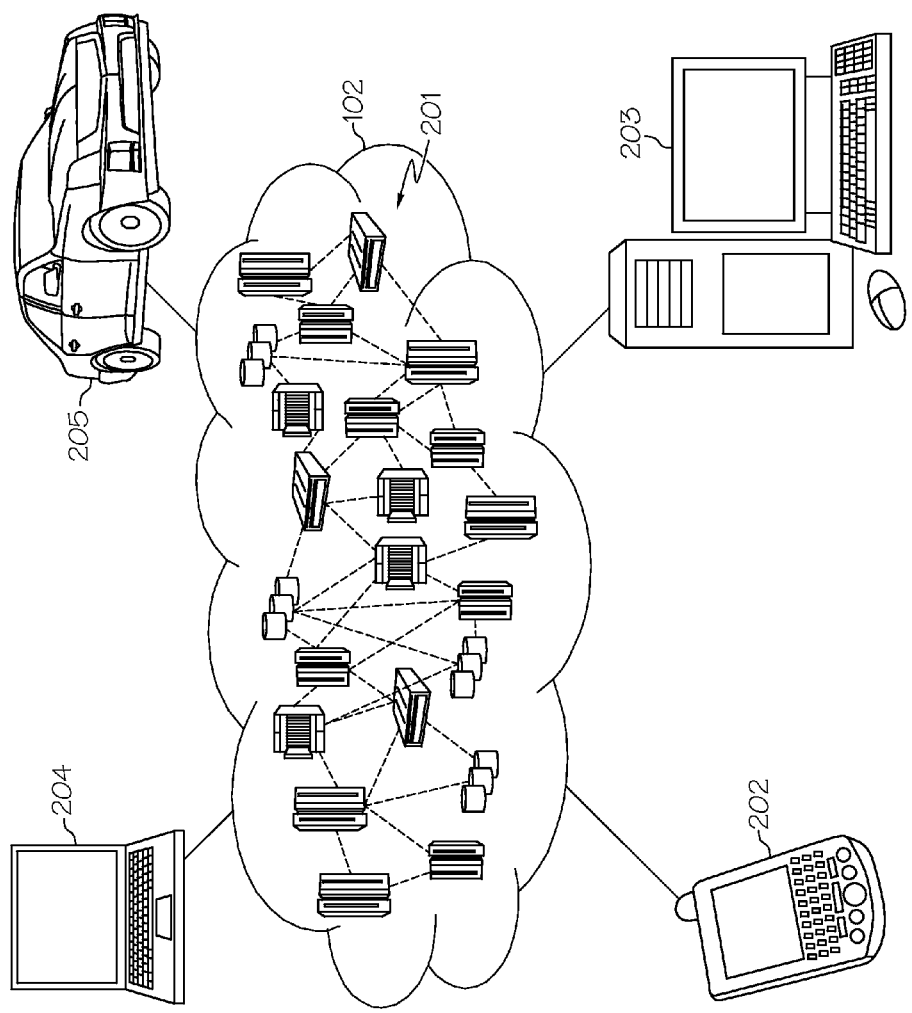
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
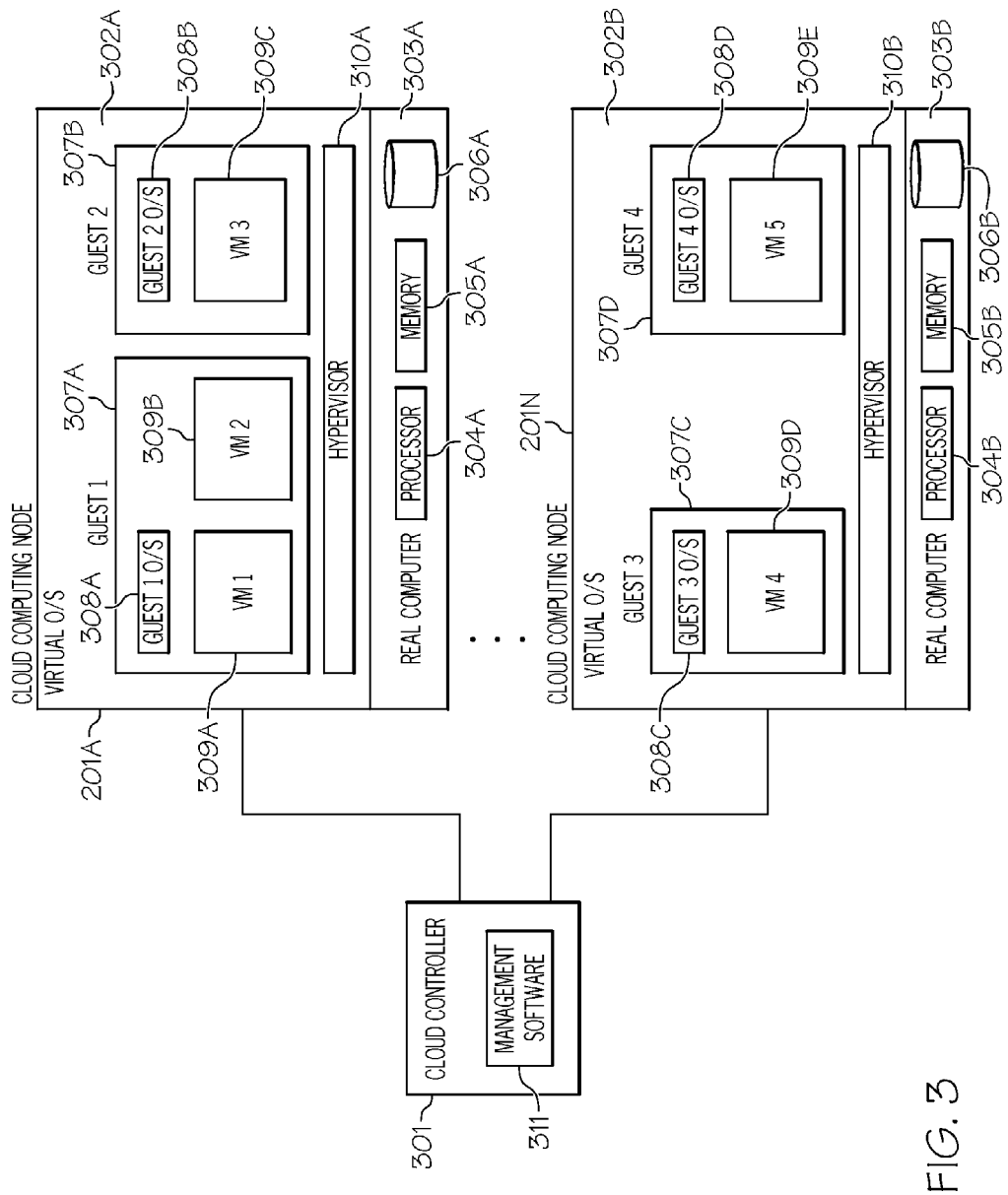
FIG. 3 illustrates a schematic of an exemplary cloud computing node in a virtualized computer environment in accordance with an embodiment of the present invention.

Referring now to FIG. 3, FIG. 3 illustrates cloud computing nodes 201A-201N in a virtualized computer environment in accordance with an embodiment of the present invention. Cloud computing nodes 201A-201N may collectively or individually be referred to as cloud computing nodes 201 or cloud computing node 201, respectively. Cloud computing nodes 201A-201N are each coupled to a cloud controller 301 configured to provide data center-level functions of communicating with hypervisors on cloud computing nodes 201 to install virtual machines, terminate/suspend virtual machines, relocate virtual machines from one cloud computing node 201 to another within the data center as well as to temporarily allocate more processing resources than the user requests to enable a multithreaded startup to initialize the operating system and middleware tiers in order to optimize the deployment time of the virtual machine as discussed further below in connection with FIG. 5.

With reference now to cloud computing node 201A, cloud computing node 201A includes a virtual operating system 302A. Operating system 302A executes on a real or physical computer 303A. Real computer 303A includes one or more processors 304A, a memory 305A (also referred to herein as the host physical memory), one or more disk drives 306A and the like. Other components of real computer 303A are not discussed herein for the sake of brevity.

Virtual operating system 302A further includes user portions 307A-307B (identified as "Guest 1 and Guest 2," respectively, in FIG. 3), referred to herein as "guests." Each guest 307A, 307B is capable of functioning as a separate system. That is, each guest 307A-307B can be independently reset, host a guest operating system 308A-308B, respectively, (identified as "Guest 1 O/S" and "Guest 2 O/S," respectively, in FIG. 3) and operate with different programs. An operating system or application program running in guest 307A, 307B appears to have access to a full and complete system, but in reality, only a portion of it is available.

Each guest operating system 308A, 308B may host one or more virtual machine applications 309A-309C (identified as "VM 1," "VM 2" and "VM 3," respectively, in FIG. 3), such as Java™ virtual machines. For example, guest operating system 308A hosts virtual machine applications 309A-309B. Guest operating system 308B hosts virtual machine application 309C.

Virtual operating system 302A further includes a common base portion 310A, referred to herein as a hypervisor. Hypervisor 310A may be implemented in microcode running on processor 304A or it may be implemented in software as part of virtual operating system 302A. Hypervisor 310A is configured to manage and enable guests 307A, 307B to run on a single host.

As discussed above, virtual operating system 302A and its components execute on physical or real computer 303A. These software components may be loaded into memory 305A for execution by processor 304A.

As also discussed above, cloud computing environment 102 (FIG. 2) can include multiple cloud computing nodes 201A-201N as is shown in FIG. 3. In one embodiment, each cloud computing node 201A-201N is configured similarly as previously discussed cloud computing node 201A. For example, cloud computing node 201N is configured similarly as cloud computing node 201A. Cloud computing node 201N includes the same elements as cloud computing node 201A. For example, guests 307C-307D (identified as "Guest 3 and Guest 4," respectively, in FIG. 3) are functionally the same as guests 307A-307B. Similarly, guest operating systems 308C-308D (identified as "Guest 3 O/S" and "Guest 4 O/S," respectively, in FIG. 3) are functionally the same as guest operating systems 308A-308B. Virtual machines 309D-309E (identified as "VM 4" and "VM 5," respectively, in FIG. 3) are functionally the same as virtual machines 309A-309C. Furthermore, hypervisor 310B is functionally the same as hypervisor 310A. Hence, the discussion of cloud computing node 201A applies to each cloud computing node 201, including cloud computing node 201N. In one embodiment, each cloud computing node 201 can be configured differently and the physical hardware, hypervisors and other components may be different as well.

Guests 307A-307D may collectively or individually be referred to as guests 307 or guest 307, respectively. Guest operating systems 308A-308D may collectively or individually be referred to as guest operating systems 308 or guest operating system 308, respectively. Virtual machines 309A-309E may collectively or individually be referred to as virtual machines 309 or virtual machine 309, respectively. Hypervisors 310A-310B may collectively or individually be referred to as hypervisors 310 or hypervisor 310, respectively.

FIG. 3 is not to be limited in scope to a particular number of cloud computing nodes 201 and each cloud computing node 201 may include any number of guests 307, guest operating systems 308, virtual machines 309, etc. Furthermore, cloud computing nodes 201 include other components that were not discussed herein for the sake of brevity. Hence, cloud computing node 201 is not to be limited in scope to the elements depicted in FIG. 3.

Referring again to FIG. 3, in some embodiments, cloud controller 301 supports a module, referred to herein as the management software 311, that can be used to manage all the hardware components of cloud computing nodes 201, monitor system utilization, intelligently deploy images of data and optimize the operations of cloud computing environment 102. Furthermore, management software 311 can be used to temporarily allocate more processing resources than the user requests to enable a multithreaded startup to initialize the operating system and middleware tiers in order to optimize the deployment time of virtual machine 309 as discussed further below in connection with FIG. 5. A description of the hardware configuration of cloud controller 301 is provided further below in connection with FIG. 4.

Figure 4:
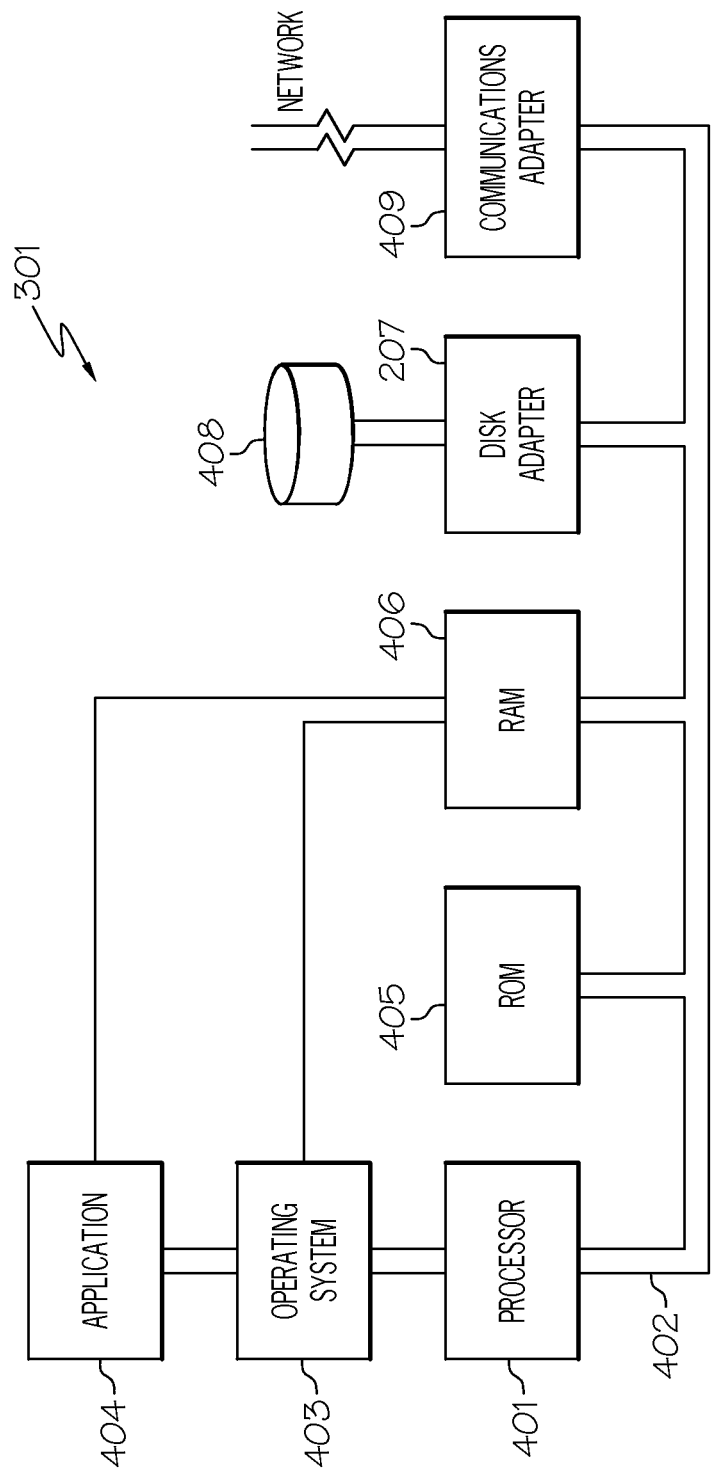
FIG. 4 illustrates a hardware configuration of a cloud controller configured in accordance with an embodiment of the present invention.

Referring now to FIG. 4, FIG. 4 illustrates a hardware configuration of cloud controller 301 (FIG. 3) which is representative of a hardware environment for practicing the present invention. Cloud controller 301 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program, such as management software 311 of FIG. 3, for temporarily allocating more processing resources than the user requests to enable a multi-threaded startup to initialize the operating system and middleware tiers in order to optimize the deployment time of virtual machine 309 as discussed further below in connection with FIG. 5.

Referring again to FIG. 4, read-only memory ("ROM") 405 is coupled to system bus 402 and includes a basic input/output system ("BIOS") that controls certain basic functions of cloud controller 301. Random access memory ("RAM") 406 and disk adapter 407 are also coupled to system bus 402. It should be noted that software components including operating system 403 and application 404 may be loaded into RAM 406, which may be cloud controller's 301 main memory for execution. Disk adapter 407 may be an integrated drive electronics ("IDE") adapter that communicates with a disk unit 408, e.g., disk drive. It is noted that the program for temporarily allocating more processing resources than the user requests to enable a multithreaded startup to initialize the operating system and middleware tiers in order to optimize the deployment time of virtual machine 309, as discussed further below in connection with FIG. 5, may reside in disk unit 408 or in application 404.

Cloud controller 301 may further include a communications adapter 409 coupled to bus 402. Communications adapter 409 interconnects bus 402 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, one of the most common guest configurations is a single core or a sub-core CPU allocation in order to achieve a high density consolidation. Since only a single or a sub-core CPU allocation is available, only a single thread (i.e., a stream of instructions) can be executed at a given time. Multithreading refers to having multiple threads or multiple streams of instructions existing within the context of a single process. These threads share the process' resources but are able to be executed independently. As a result, if the operating system and middleware tiers could be initialized using a multithreaded startup, then the initialization of the operating system and middleware tiers could be performed more quickly thereby reducing the deployment time for the virtual guest instance and the virtual machine. However, multithreading cannot currently be achieved since only a single or a sub-core CPU allocation is available. Hence, the deployment time for the virtual guest instances and the virtual machines are significantly longer than if the operating system and middleware tiers could be initialized using a multithreaded startup.

The principles of the present invention provide a means for temporarily allocating more processing resources than the user requests to enable a multithreaded startup to initialize the operating system and middleware tiers in order to optimize the deployment time of virtual machine 309 (FIG. 3) as discussed further below in connection with FIG. 5.

Figure 5:
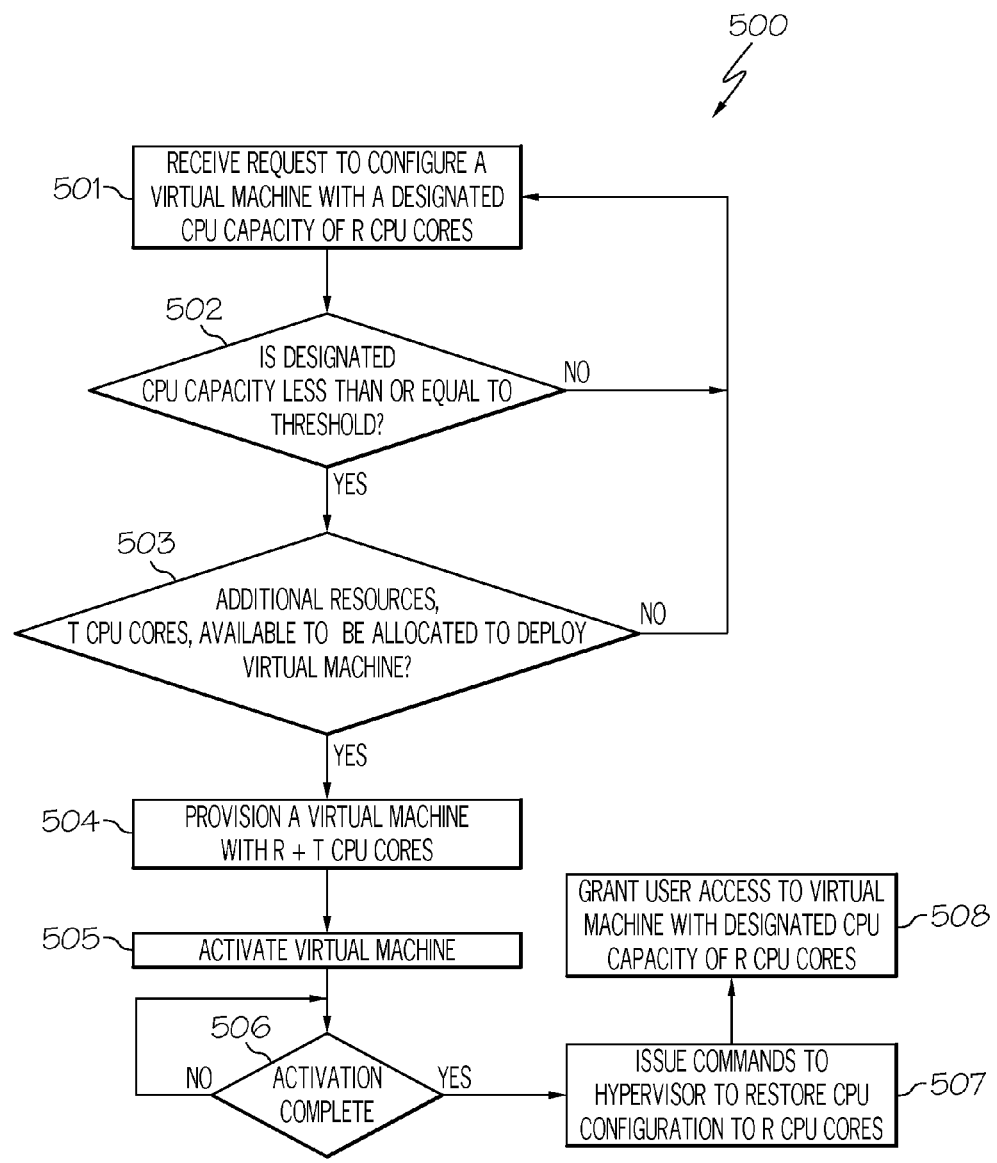
FIG. 5 is a flowchart of a method for optimizing the virtual machine deployment time in accordance with an embodiment of the present invention.

FIG. 5 is a flowchart of a method 500 for optimizing the virtual machine deployment time in accordance with an embodiment of the present invention.

Referring to FIG. 5, in conjunction with FIGS. 1-4, cloud controller 301 receives a request from the user to configure a virtual machine 309 with a designated CPU capacity of R CPU cores, where R is a positive real number.

In step 502, controller 301 determines if the designated CPU capacity is less than or equal to a threshold. For example, a determination may be made as to whether R is less than or equal to 1, signifying a single CPU core. If so, then virtual machine 309 becomes a candidate for optimization because additional resources may be utilized during the initial deployment time of virtual machine 309 to enable a multithreaded startup to initialize the operating system and middleware tiers so as to reduce the deployment time of virtual machine 309.

If the user's designated CPU capacity for virtual machine 309 is not less than or equal to a threshold, then cloud controller 301 waits to receive another request from the user to configure a virtual machine 309 with a designated CPU capacity of R CPU cores in step 501.

If, however, the user's designated CPU capacity for virtual machine 309 is less than or equal to the threshold, then, in step 503, a determination is made by cloud controller 301 as to whether the cloud computing environment 102 has additional available resources, designated as T CPU cores, where T is a positive real number, to allocate to deploy virtual machine 309. If there are no additional resources available to cloud computing environment 102 to be allocated to deploy virtual machine 309, then cloud controller 301 waits to receive another request from the user to configure a virtual machine 309 with a designated CPU capacity of R CPU cores in step 501.

If, however, there are additional resources available to cloud computing environment 102 that can be allocated to deploy virtual machine 309, then, in step 504, cloud controller 301 provisions virtual machine 309 with the designated CPU capacity plus the additional CPU capacity (R+T CPU cores). By provisioning virtual machine 309 with more CPU cores than requested by the user, the operating system and middleware tiers may be initialized using a multithreaded startup thereby reducing the deployment time of virtual machine 309.

In step 505, cloud controller 301 activates virtual machine 309, which includes the phases of activating or initializing the operating system, network and middleware tiers.

In step 506, a determination is made by cloud controller 301 as to whether the activation is completed. If the activation is not completed, then cloud controller 301 continues to determine if the activation is completed.

If, however, the activation is completed, then, in step 507, cloud controller 301 issues commands to hypervisor 310 of virtual machine 309 to restore the CPU configuration to the user designated CPU capacity (R CPU cores). In this manner, the additional resources would only be available during the initial deployment time of virtual machine 309 and removed before the user is granted access to the system when it comes online.

In step 308, cloud controller 301 grants the user access to virtual machine 309 with the user designated CPU capacity (R CPU cores).

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing virtual machine deployment time, the method comprising:

receiving a request to configure a virtual machine with a designated CPU capacity comprising R CPU cores, wherein said R is a positive real number;

determining if said designated CPU capacity is less than or equal to a threshold, wherein said threshold comprises a single CPU core;

in response to said designated CPU capacity being less than or equal to said threshold:

provisioning said virtual machine on a hypervisor with a CPU configuration comprising said designated CPU capacity plus an additional CPU capacity;

activating said virtual machine utilizing said designated CPU capacity plus said additional CPU capacity; and issuing, by a processor, commands to said hypervisor to restore the CPU configuration of said virtual machine to only said designated CPU capacity in response to a completion of said activation of said virtual machine.

2. The method as recited in claim 1 further comprising:
determining if a cloud computing environment has said additional CPU capacity to allocate to deploy said virtual machine in response to said designated CPU capacity being less than or equal to said threshold.

3. The method as recited in claim 2, wherein said virtual machine is provisioned with said designated CPU capacity plus said additional CPU capacity in further response to said cloud computing environment having said additional CPU capacity to allocate to deploy said virtual machine.

4. The method as recited in claim 1 further comprising:
granting a user access to said virtual machine with said designated CPU capacity.

5. A computer program product embodied in a non-transitory computer readable storage medium for optimizing virtual machine deployment time, the computer program product comprising the programming instructions for:
receiving a request to configure a virtual machine with a designated CPU capacity comprising R CPU cores, wherein said R is a positive real number;
determining if said designated CPU capacity is less than or equal to a threshold, wherein said threshold comprises a single CPU core;
in response to said designated CPU capacity being less than or equal to said threshold:
provisioning said virtual machine on a hypervisor with a CPU configuration comprising said designated CPU capacity plus an additional CPU capacity;
activating said virtual machine utilizing said designated CPU capacity plus said additional CPU capacity; and
issuing commands to said hypervisor to restore the CPU configuration of said virtual machine to only said designated CPU capacity in response to a completion of said activation of said virtual machine.

6. The computer program product as recited in claim 5 further comprising the programming instructions for:
determining if a cloud computing environment has said additional CPU capacity to allocate to deploy said virtual machine in response to said designated CPU capacity being less than or equal to said threshold.

7. The computer program product as recited in claim 6, wherein said virtual machine is provisioned with said designated CPU capacity plus said additional CPU capacity in further response to said cloud computing environment having said additional CPU capacity to allocate to deploy said virtual machine.

8. The computer program product as recited in claim 5 further comprising the programming instructions for:
granting a user access to said virtual machine with said designated CPU capacity.

9. A system, comprising:
a memory unit for storing a computer program for optimizing virtual machine deployment time; and
a processor coupled to said memory unit, wherein said processor, responsive to said computer program, comprises:
circuitry for receiving a request to configure a virtual machine with a designated CPU capacity comprising R CPU cores, wherein said R is a positive real number;
circuitry for determining if said designated CPU capacity is less than or equal to a threshold, wherein said threshold comprises a single CPU core;
in response to said designated CPU capacity being less than or equal to said threshold:
circuitry for provisioning said virtual machine on a hypervisor with a CPU configuration comprising said designated CPU capacity plus an additional CPU capacity;
circuitry for activating said virtual machine utilizing said designated CPU capacity plus said additional CPU capacity; and
circuitry for issuing commands to said hypervisor to restore the CPU configuration of said virtual machine to only said designated CPU capacity in response to a completion of said activation of said virtual machine.

10. The system as recited in claim 9, wherein said processor further comprises:
circuitry for determining if a cloud computing environment has said additional CPU capacity to allocate to deploy said virtual machine in response to said designated CPU capacity being less than or equal to said threshold.

11. The system as recited in claim 10, wherein said virtual machine is provisioned with said designated CPU capacity plus said additional CPU capacity in further response to said cloud computing environment having said additional CPU capacity to allocate to deploy said virtual machine.

12. The system as recited in claim 11, wherein said processor further comprises:
circuitry for granting a user access to said virtual machine with said designated CPU capacity.

* * * * *